Figure 1:
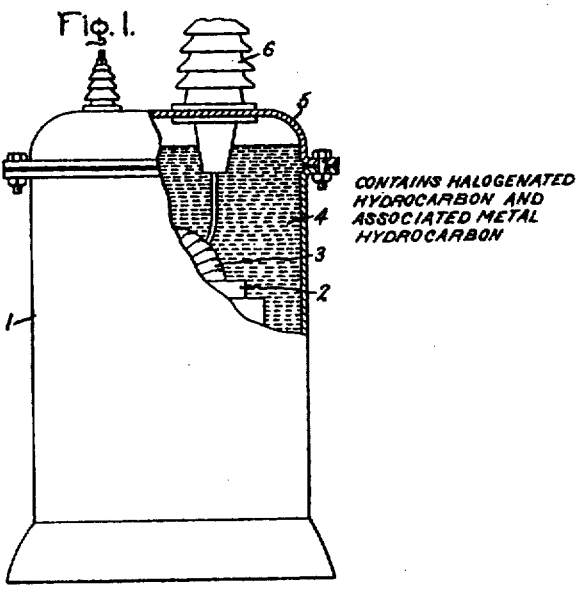

April 26, 1949.  F. M. CLARK  2,468,544
STABILIZED HALOGENATED COMPOSITIONS
AND ELECTRICAL DEVICES
Filed Nov. 10, 1945

CONTAINS HALOGENATED
HYDROCARBON AND
ASSOCIATED METAL
HYDROCARBON

Inventor:
Frank M. Clark,
by Harry E. Dunham
His Attorney.

Patented Apr. 26, 1949

2,468,544

UNITED STATES PATENT OFFICE 2,468,544

STABILIZED HALOGENATED COMPOSITIONS AND ELECTRICAL DEVICES

Frank M. Clark, Pittsfield, Mass., assignor to General Electric Company, a corporation of New York Application November 10, 1945, Serial No. 627,834

10 Claims. (Cl. 175—41)

The present application is a continuation-in-part of my prior application Serial No. 498,834, filed August 16, 1943, now abandoned. The invention thereof comprises compositions of halogenated hydrocarbons, and in particular, liquid chlorinated hydrocarbons. In accordance with my invention such compositions are associated with a minor amount, which may be less than one per cent, of organo-metallic compound, whereby the deleterious effect of halogen decomposition product is inhibited.

Halogenated aryl hydrocarbons are relatively stable compounds. Halogenated alkyl compounds are less stable, being dissociated but slightly even on standing. Decomposition of a halogenated aryl compound, however, may occur when such compound is brought into contact with an electric arc. Some decomposition may even occur when such compound is subjected for long periods to voltage stress (as in capacitors), especially at elevated temperatures.

Liquid halogenated compounds of benzene, diphenyl, and the like, are used in various electric devices as dielectric, insulating or cooling agents. The presence of even very small amounts of hydrogen halide, or other corrosive decomposition product, such as may be produced by an arc in contact with a halogenated compound, may damage such apparatus. For example, paper insulation in electric transformers is seriously depreciated by the presence of hydrogen chloride, especially when some moisture is present. Manila or kraft paper after even one day of exposure at 75° C. to a liquid chlorinated hydrocarbon containing hydrogen chloride will lose 70 to 80 per cent of its tensile strength.

I have discovered that halogen decomposition products can be rendered substantially innocuous if, in accordance with my present invention, a halogenated composition, which is in contact with insulating or other material to be protected, is associated with organo-metallic compound. Such compounds, which have a molecular carbon-to-metal linkage, are described in Organic Chemistry by Gilman, vol. I, pages 491 and 492. This book was published in 1943 by John Wiley & Sons, New York.

An organo-metallic compound, for example, may have the formula $MR_x$. In this formula M represents a metal chosen from the group consisting of tin, lead, and mercury; R represents a plurality of aliphatic, alicyclic, or aromatic groups; and $x$ represents an integer corresponding to the valency of the metal in the compound and numerically is within the limits of 2 to 4.

$MR_x$ may include compounds in which R represents only aliphatic, aromatic or alicyclic groups. It also includes compounds in which R represents combinations of the aliphatic, aromatic, and alicyclic groups and includes compounds in which such groups contain substituents, such as chlorine or other halogen or hydroxyl or amine radicals. For example the formula $MR_x$ may include a metal combined directly with an aliphatic group or groups and also one or more aromatic or alicyclic groups. An example of an organo-metallic compound containing such a multiplicity of unlike groups is dibutyl diphenyl tin.

Other examples of an organo-metallic compound capable of use as an inhibitor in accordance with my invention are compounds having the formula $MR_xY$ in which R represents organic groups or combinations thereof as previously stated and Y represents inorganic substituent radical, such as halogen or hydroxyl, which are attached directly to the metal. Examples of compounds having the formula $MR_xY$ are triphenyl tin chloride, triphenyl tin hydroxide, diphenyl tin dichloride, and monophenyl tin trichloride. All such organo-metallic compounds will effectively combine with hydrogen halide in a liquid halogenated composition when liberated by any cause in such composition.

Figure 2:
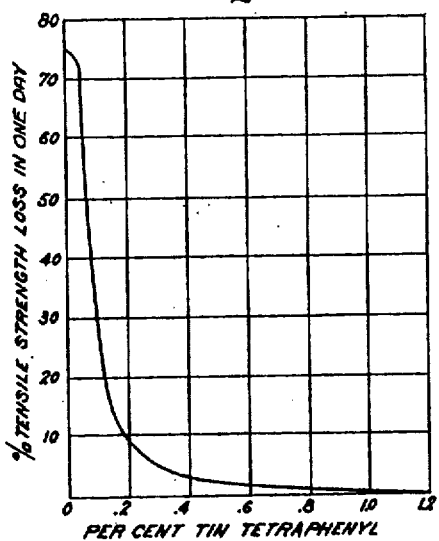
Figure 3:
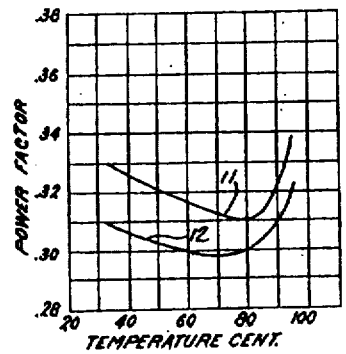

In the accompanying drawing, Fig. 1 is a side elevation of a transformer as illustrative of one form of electrical device containing a composition embodying my invention; Fig. 2 is a graph showing the extent of protection afforded paper by tin tetraphenyl in a liquid halogenated composition which is exposed to hydrogen chloride gas; Fig. 3 is a graph showing power factor values over a range of temperatures in capacitors containing a dielectric material embodying my invention.

Referring to Fig. 1, the transformer illustrated comprises as usual a tank 1 containing transformer elements comprising essentially a core 2, electrical windings 3, and a quantity of liquid cooling and insulating liquid 4. The tank cover 5 may be tightly sealed, a frangible window (not shown) being provided for the emergency release of excessive gas pressure. An external bushing 6 of the transformer having no relevance to the present invention has been shown in part broken away.

The liquid filling 4 is liquid halogenated hydrocarbon and may consist of a mixture of chlorinated diphenyl and chlorinated benzene in which the chlorinated diphenyl content may vary widely, say from 1 to 99 per cent. Such a composition may consist of a mixture of trichlorbenzene and hexachlor or pentachlor diphenyl. A preferred liquid chlorinated aryl composition consists by weight of 40 per cent trichlorbenzene and 60 per cent hexachlordiphenyl. Compositions of this character are described in my prior Patent 1,931,455 of October 17, 1933. Various other halogenated compounds may constitute a part of such compositions as well understood, including, for example, halogenated compounds of diphenyl oxide, diphenyl ketone, diphenyl methane, diphenyl ethane, naphthalene and nitro-diphenyl.

The insulation of the transformer windings ordinarily consists of manila or kraft paper about .003 inch in thickness. Cotton and other fibrous insulation may be used. If the cooling and insulating liquid consisting of chlorinated aryl compounds is subjected to conditions favoring decomposition, hydrogen chloride is formed and the paper insulation in contact with the contaminated liquid becomes quickly deteriorated.

The curve of Fig. 2 shows the relation of loss in tensile strength of paper in per cent when immersed in a series of chlorinated compositions containing respectively by weight from 0.05 to 1.2 per cent of tin tetraphenyl in solution and exposed to the conditions favorable to the formation of hydrogen chloride. As indicated by the graph, paper immersed in chlorinated compound containing no additive ingredient, thus permitting hydrogen chloride to remain in solution therein, loses about 75 per cent of its tensile strength in one day. On the other hand, paper immersed in the same kind of chlorinated composition containing in solution about .25 per cent of tin tetraphenyl under the same conditions loses only about 5 per cent of its tensile strength in the same length of time. As indicated by the graph, the loss of tensile strength of paper under the same conditions resulting in decomposition of the chlorinated composition is reduced substantially to zero if the content of tin tetraphenyl therein is as high as about one per cent. Amounts as low as .05 per cent of a metallo-hydrocarbon present in a chlorinated aryl compound produce an advantageous reduction in the harmful chemical effect of dissolved hydrogen chloride on paper, cotton or other cellulosic material present therein.

Not only does the presence of an organo-metallic compound in a halogenated liquid in the amount by weight of about 0.05 to one per cent reduce the deleterious effect of such liquid on organic insulation, it also greatly reduces ordinary rusting of various metals which would occur when metal normally located below the surface of the liquid chlorinated composition is exposed to air. When a transformer containing such a chlorinated liquid is drained, for example, for the carrying-out of repairs, exposure to air occurs of surfaces coated with such liquid. Under such conditions rusting occurs which is especially rapid in the presence of moisture. When, however, the halogenated liquid in contact with surfaces contained an organo-metallic compound as herein described, then upon exposure to air rusting is restricted to the amount which normally occurs when clean ferrous metal is exposed to the atmosphere.

A composition embodying my invention advantageously may be used as a liquid dielectric material in capacitors. As described in my prior Patent No. 2,041,594, dated May 19, 1936, chlorinated aryl compounds, and particularly pentachlor diphenyl, may be used advantageously as capacitor dielectric media. Such compounds commonly are introduced as an impregnant for capacitors in which the armatures are separated by several sheets of thin paper. It is frequently desired to operate such capacitors continuously when the ambient temperature is as high as 90° C., or higher.

As shown in Fig. 3 by graph 11, the power factor expressed in per cent of a capacitor impregnated with ordinary pentachlor diphenyl tends to fall somewhat as the ambient temperature is increased from about 25° C. to about 80° C. The power factor rises with further increase in temperature above 80° C. When the same type of capacitor is impregnated with pentachlor diphenyl having associated therewith about one-quarter per cent of tin tetraphenyl, as shown by graph 12, lower power factor values accompany operation over an elevated range of temperature.

Life tests have shown that capacitors containing an organo-metallic compound such, for example, as tin tetraphenyl, have a longer useful life and a greater dielectric stability than exactly similar capacitors unprovided with such compound. Capacitors containing organo-metallic compound do not show the slow rise of power factor with time when operated in a high ambient temperature which is characteristic of capacitors impregnated with chlorinated dielectric materials which are unassociated with an organo-metallic compound.

The advantages accruing from my invention are obtained in electric switches. When chlorinated diphenyl or other suitable halogenated aryl compounds are employed in electric switches, the unavoidable arcing which accompanies make-and-break of the switch terminals results in some decomposition. The hydrogen halide thus formed is rendered innocuous by the presence of an organo-metallic compound. Switches so provided are practically free from the rusting and corrosion which ordinarily accompanies the use of switches filled with halogenated hydrocarbons.

Reference has been made herein to tin tetraphenyl and other examples of my invention. Other organo-metallic compounds which may be associated with halogenated hydrocarbons for the purposes of my invention, include among the tin compounds, the tetramethyl and the tetraethyl compounds. Mercury compounds, such as the methyl and the ethyl, constitute other examples. Lead compounds, such as lead tetramethyl or lead tetraethyl, may be used as inhibitors. In general, tin tetraphenyl dibutyl diphenyl tin and lead tetraphenyl are preferred examples of inhibitors embodying my invention.

Although the advantages of my invention have been stated with reference to halogenated aryl compounds, it should not be considered as being limited solely to such compounds. Halogenated alkyl compounds may be stabilized by the addition of organo-metallic compounds.

What I claim as new and desire to secure by Letters Patent of the United States is:

1. A liquid dielectric and insulating composition consisting essentially of halogenated aryl hydrocarbon and containing in solution by weight about 0.05 to 1 per cent of an organo-metallic compound chosen from the group consisting of compounds having the formulae $MR_x$ and $MR_xY$ in which M is a metal chosen from the group consisting of tin, lead and mercury, R is an aromatic radical, $x$ is an integer in the range of 2 to 4 and Y is a halogen.

2. A normally liquid dielectric and insulating composition consisting essentially of halogenated aryl hydrocarbon and containing in solution by weight about one-fourth to one per cent of organo-metallic compound having the formula $MR_x$ in which M is a metal chosen from the group consisting of tin, lead, and mercury; R is an organic radical chosen from the group consisting of aliphatic and aromatic radicals; combinations of such radicals and radical containing substituents; and $x$ is an integer in the range of 2 to 4.

3. A normally liquid dielectric and insulating composition consisting essentially of halogenated aryl hydrocarbon and containing in solution by weight about one-fourth to one per cent of organo-metallic compound having the formula $MR_xY$ in which M is a metal chosen from the group consisting of tin, lead, and mercury; R is a radical chosen from the group consisting of aliphatic and aromatic radicals, combinations of such radicals, and such radical containing substituents, $x$ is an integer in the range of 2 to 4, and Y is an inorganic substituent chosen from the group consisting of halogen and hydroxyl attached directly to the metal.

4. The method of rendering innocuous hydrogen halide formed in liquid halogenated aryl hydrocarbon when subjected to decomposing influence which consists in causing such hydrogen to combine chemically with an organo-metallic compound chosen from the group consisting of compounds having the formulae $MR_x$ and $MR_xY$ in which M is a metal chosen from the group consisting of tin, lead and mercury, R is an aromatic radical, $x$ is an integer in the range of 2 to 4, and Y is a halogen.

5. An electrical device comprising cooperating electric elements and a liquid chlorinated aryl hydrocarbon cooling and insulating medium therefor, said medium containing in solution by weight about one-fourth to one per cent of organo-metallic compound containing carbon-to-metal linkage of the type $MR_x$, M being a metal chosen from the group consisting of tin, lead and mercury, R is an aromatic radical and $x$ is an integer in the range of 2 to 4.

6. A liquid composition suitable for dielectric purposes consisting of chlorinated aryl hydrocarbon and in admixture therewith about .05 to 1.2 per cent of tin tetraphenyl.

7. A capacitor dielectric material consisting of pentachlor diphenyl having associated therewith about one-quarter per cent of tin tetraphenyl.

8. Dielectric and insulating liquid compositions consisting of chlorinated aryl hydrocarbon and about .05 to .25 per cent of tin tetraphenyl.

9. An electrical device provided with a dielectric and insulating element consisting of a halogenated aryl hydrocarbon containing in solution therewith about .05 to 1.2 per cent of tin tetraphenyl.

10. A liquid dielectric and insulating composition including chlorinated diphenyl as an ingredient and containing in solution by weight about 0.05 to 1 per cent of an organo-metallic compound of a metal selected from the group consisting of tin, lead, and mercury, the metal being attached directly to a carbon atom of an aromatic radical.

FRANK M. CLARK.

REFERENCES CITED

The following references are of record in the file of this patent:

UNITED STATES PATENTS

| Number | Name | Date |
| --- | --- | --- |
| 1,668,022 | Midgley | May 1, 1928 |
| 1,857,761 | McCabe et al. | May 10, 1932 |
| 2,036,274 | Holler | Apr. 7, 1936 |
| 2,181,915 | Rosen | Dec. 5, 1939 |
| 2,259,978 | McLean | Oct. 21, 1941 |